March 24, 1959 M. K. ROGERS 2,878,739

PRODUCTION OF OFFSET NEGATIVES AND OFFSET PLATES WITHOUT THE USE OF A CAMERA

Filed Aug. 31, 1954 2 Sheets-Sheet 1

Murray K. Rogers
INVENTOR.

BY Clarence A. O'Brien and Harvey B. Jacobson
Attorneys

March 24, 1959 M. K. ROGERS 2,878,739

PRODUCTION OF OFFSET NEGATIVES AND OFFSET PLATES WITHOUT THE USE OF A CAMERA

Filed Aug. 31, 1954 2 Sheets-Sheet 2

Murray K. Rogers
INVENTOR.

BY Clarence A. O'Brien
and Harvey B. Jacobson
Attorneys

United States Patent Office 2,878,739
Patented Mar. 24, 1959

2,878,739

PRODUCTION OF OFFSET NEGATIVES AND OFFSET PLATES WITHOUT THE USE OF A CAMERA

Murray K. Rogers, Paducah, Ky.

Application August 31, 1954, Serial No. 453,220
4 Claims. (Cl. 95—73)

This invention relates to photographic printing or copying apparatus and it has for its principal object to provide an apparatus by means of which all the operations connected with the making of an offset printing plate and including the making of the negative for such printing plate or for a lithographic printing plate can be performed.

A further object of the invention consists in providing an apparatus of the above named type by means of which negatives of all types may be produced from a copy either on a film or on a paper sheet and either from one side or from both sides of the copy.

A further object of the invention consists in providing an apparatus of the above named type in which in addition to the above copying, photoprinting or photostatic reproduction may be performed.

In the conventional and widely used processes resulting in the preparation of a zinc, aluminum (multilith, alumilith) plate or of plastic or elastic plates or sheets for the offset printing machine or for a lithographic printing process the first step always involves the use of a camera by means of which a screened negative is made, which screened negative is then developed, and opaqued, and is then used to produce the ink taking copy on the impression plate or sheet which is capable of applying the ink in exact proportion to the illumination of each point on a paper.

The conventionally used method does not present difficulties, but entails the use of many pieces of equipment, such as a camera, an opaquing table etc., which makes the use of an offset printing process costly and complicated. Further, the use of some equipment, like the camera, also entails the use of skilled work and an experienced and highly skilled operator. The widespread use of small offset printing presses especially in small printing shops therefore encounters many obstacles.

The invention attempts to minimize and to reduce the additional equipment which must be procured by the owner of a shop in order to operate successfully a small offset printing press. Therefore, in the first place, the equipment to be used according to the invention permits the elimination of the camera and provides means for making a negative (and if necessary a screened negative) directly from the original copy, which negative may then be used for preparing the offset printing plate. Further, the apparatus according to the invention may also be used for producing negatives of all types, and therefore, also, the production of negatives other than those which are used in connection with offset printing plates. These negatives need not be screened and the apparatus may therefore also be used for contact printing or for photostat copy making.

The apparatus, according to the invention, is further specially equipped for opaquing work which may be carried out on the apparatus itself with only one additional unit being added. The operation of opaquing as well known consists in covering all those parts of the negative which are found to be transparent to light or partly transparent to light at places, at which passage of light should not occur.

This operation must therefore be carried out on a lighted table. Customarily, the opaquing operation is accompanied or followed by the masking of the negative by means of which the desired section of the picture is selected which will be burned in or etched on the zinc, aluminum or other metal plate. According to the invention the apparatus is so constructed that with the sole addition of an opaquing plate it is transformed into a work table lighted from below on which the opaquing operation may be carried out.

A special feature of the invention consists in equipment permitting to obtain reflex negatives from an original copy which shows pictures or printed matter on the two sides of a single sheet, without disturbing each other and therefore copies of an original may be made which shows illustrations or pictures or printed matter in book form.

Further special features and more specific objects will be apparent from the following detailed specification.

The invention is illustrated in the accompanying drawings by way of example. It is however to be understood that the example which has been shown in the drawing has been selected because it facilitates the explanation of the principle of the invention and illustrates the best mode of applying such principle. However, other modes of applying the principle may be selected and a departure from the example which has been illustrated is therefore, not necessarily a departure from the essence of the invention.

Figures 1, 2, 3:
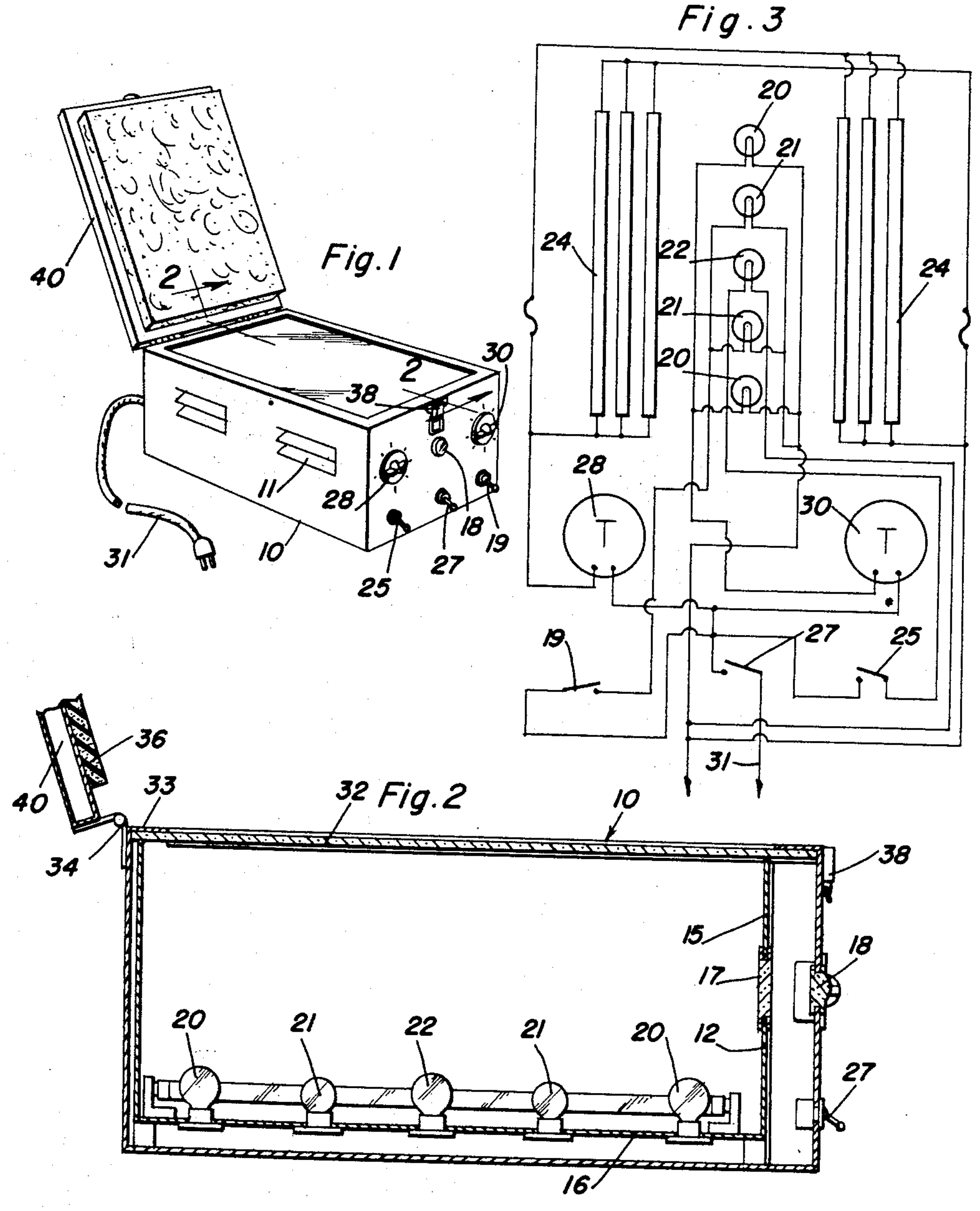
Figure 1 is a perspective view of the apparatus according to the invention.
Figure 2 is a sectional elevational view of the apparatus a section being taken along line 2—2 of Figure 1.

Figure 3 diagrammatically illustrates the connections of the various lamps, timers and switches.

Figures 4, 5, 6:
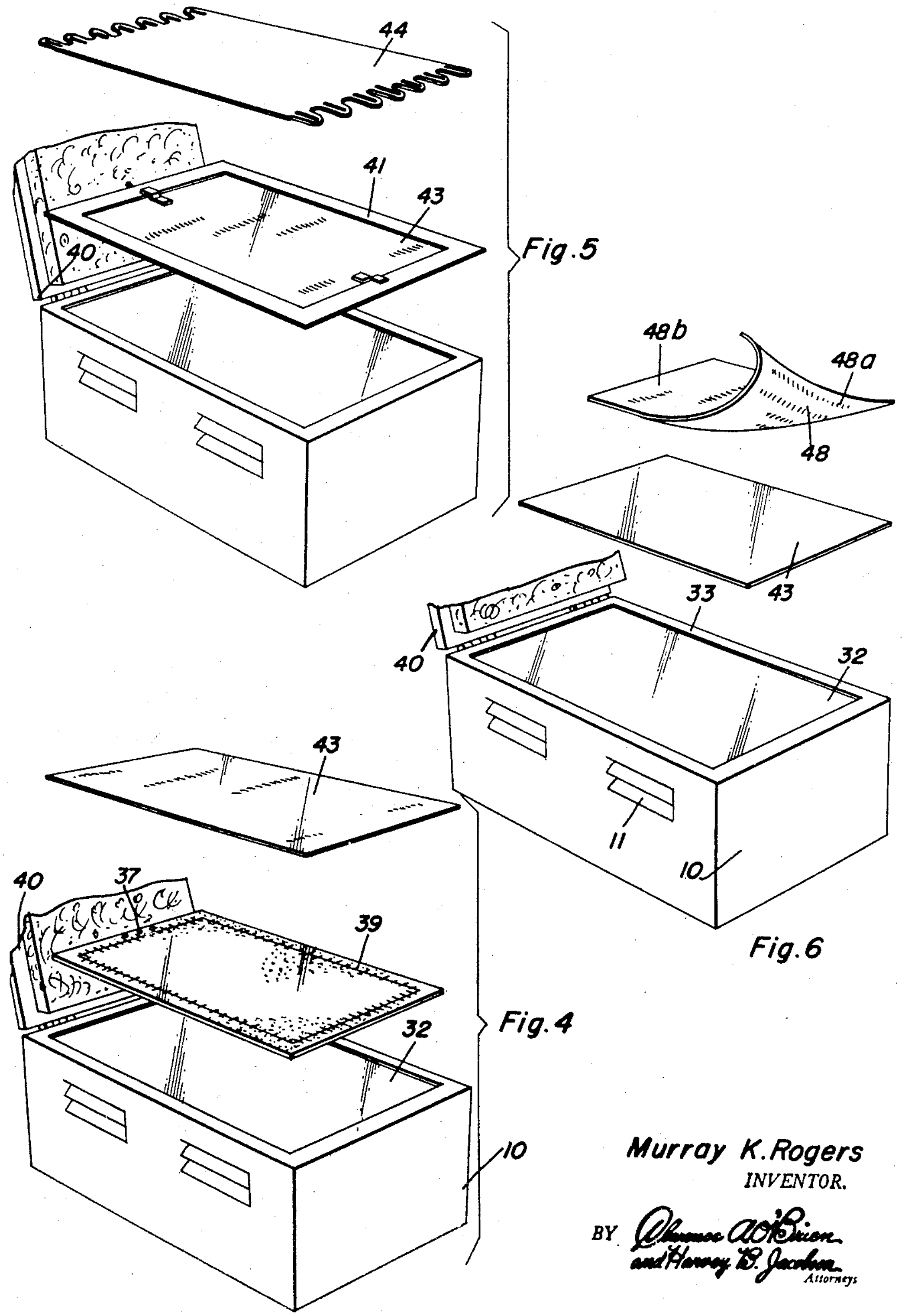

Figure 4 is a perspective view illustrating the use of the apparatus during the opaquing operation.

Figure 5 is a perspective view illustrating the process of producing an offset printing plate from a negative.

Figure 6 is a perspective view illustrating the production of a negative from two sides of an original copy.

The apparatus according to the invention, constructed to allow carrying out of all steps of the production, from an original copy, of a burned in, etched or otherwise reproduced image on a metal, plastic or elastic offset printing plate or sheet, comprises essentially a box 10 made of any suitable material, and provided with louvers 11 which serve to ventilate the interior of the box.

The box is provided with a hinged cover or lid 40 to be described below.

The interior of the box 10 is provided with a lining which may consist of any suitable material, such as metal, plastic or the like, and which is preferably provided with a highly reflecting finish. The lining may preferably consist of sheets which are sufficiently strong to be usable even if not directly applied to a wall and the front plate of the lining 14 and the base plate 15 of the lining may therefore be spaced from the walls of the box 10.

The front wall (Figure 2) may be provided with a window 17 covered with a clear plastic or with a glass plate which is located in front of a ruby red light cap 18 such as conventionally used in front of pilot lights, through which light conditions in the interior of the box may be observed.

In the interior of the box illumination means for all operations to be performed by the apparatus are housed. These operations require different types of light sources and therefore the interior of the box is equipped with incandescent lamps 20, 21, 22 and with so-called "black light" fluorescent tubes 24.

The incandescent lamps are of three types, all of them being of relatively low power. Two lamps 20 are shown in the example which has been illustrated and these may be 7½ watt lamps used for exposure in order to produce a negative from an original copy. Two further lamps 21 are illustrated which may for instance be 10 w. lamps, preferably of the frosted type which lamps, as will be seen from the following description are used for the opaquing operation. The further lamp 22 is a photo-darkroom safety lamp emitting red light not affecting the emulsions.

In the example illustrated the incandescent lamps are all arranged in a series along the plane of symmetry of the box.

Preferably on both sides of this plane of symmetry a number of "black light" fluorescent tubes are arranged, each of which being for instance a 15 w. lamp.

All the lamps are mounted on suitable sockets carried either by the bottom wall of the box or by a baseboard mounted thereon with their upper portions receiving the lamps projecting through the lining 16, the latter acting as a reflector for the lamps by virtue of its highly finished reflecting surface.

The various lamps are controlled by a number of switches and timers all mounted on the front wall of the box. The safety lamp 22 is controlled by a toggle switch 25, while a further toggle switch 19 controls the two 10 w. lamps 21, the other lamps being controlled by two timers 28, 30. The timers are of a well known construction and need not be described. The timer 30, for instance, is a timer adapted to be adjusted for 1 to 60 seconds and it controls the circuits of the lamps 21. The second timer 28 controls the circuit of the "black light" fluorescent lamps and this timer should be adjustable for time intervals of 1 to 30 minutes, for instance.

Finally, a main or power switch 27 is arranged on the front wall which controls the supply of power to the apparatus.

The connections are shown in Figure 3, the main supply conductors leading to a cable 31 which may be plugged in any outlet.

The upper end of the open box is covered by a plate 32 made of opal glass or of a similar light diffusing material held in a suitable frame 33 which fits into the open box top.

The lid 40 is hinged to the box by means of hinges 34 and may be moved either into a closed position or into such a position that it clears the top of the box completely. This lid is provided with a thick sponge rubber sheet 36 which is of such size that it will be applied against the glass plate 32 when the lid 40 is closed. The lid and the box are provided with a conventional closure device which is shown at 38.

In addition the apparatus comprises the opaquing plate 39 made of double strength safety glass which plate is to be placed on top of the box over the glass plate 32 during the opaquing operation. This plate may rest on and fit into the frame 33. It is provided along each side with a clearly visible printing scale. On it the negative to be opaqued is placed during the opaquing operation. Moreover the opaquing plate is provided with studs 37 for holding stencil sheets.

The apparatus is usable for different processes as the operation of the apparatus differs somewhat according to the process which is carried out. The principal use of the apparatus consists in transferring prepared copy, type proofing, drawings, pictures etc. to negative material, to photostat papers etc. and then after developing to transfer the picture from the negative material to a sensitized plate of metal, plastic, paper, etc. such as commonly used in photo offset printing presses or in lithographic presses.

The apparatus however also performs other operations. Essentially, these operations fall in the following groups:

(1) Contact printing.
(2) Photostat copy printing.
(3) Making of negative copies without camera.
(4) Opaquing (touching up and masking of negatives).
(5) Exposure of pre-sensitized printing plates used in printing machines.

The apparatus is also usable for making double negatives which means that the negatives are not only made on one side but on both sides of a sheet, and moreover the apparatus may make negatives from both sides of an original copy, for instance. Therefore, bound sheets, booklets, pamphlets and the like may be reproduced on negatives and photostats or other copies may be made from both sides of the sheets and may then be joined to form a booklet or the like.

In order to make an offset printing plate to be used on the offset press first a negative on film is made from the original copy. As it is necessary to produce a screened image, one of the methods may be used to obtain such a screened photograph which consists for instance in using a pre-screened or auto-screened film, that is a film which already contains the screening.

If no auto-screened or pre-screened film is used a contact screen may be inserted when the negative is made. The contact screen is placed on top of the photograph or other original copy with the emulsion side looking upwardly the standard film being then placed over the screen with its emulsion looking downwardly.

When one of these methods is used the apparatus is operated in a darkroom and the switch 25 is turned on to illuminate the safety light. The original copy is then placed on the opal glass surface with its face up and the film 43 and an auto-screen film with the emulsion side turned toward the copy is placed on top of the original copy. Then the padded lid 40 is closed pressing the film towards the glass plate resiliently by means of the sponge rubber sheet. The timer 30 is set for the desired exposure and is operated so that exposure takes place with an exposure time set. During exposure the film 43 is exposed to the light of the 7½ w. lamps 20 which passes through the original copy resting on the glass plate.

After the exposure the apparatus is opened, the film is removed and is developed. Then the opaquing plate is placed on the frame 33 on top of the opal glass plate and the negative 43 is placed on the opaquing plate 39 (Figure 4) and the switch 19 is turned on so that the opaquing plate is illuminated by the lamps 21. Opaquing then takes place, the operator inspecting the negative on the film and searching for points where the light comes through the emulsion at places at which the light is not supposed to pass.

The opaquing process is necessary to eliminate all those spots, sometimes only of pin point size, where the light can penetrate because the emulsion has been removed accidentally or where, because of dust and other depositions, transparent spots are formed on the negative. The opaquing operation performed by the operator consists in covering up these spots and by means of the graduations on the side of the opaquing plate the operator also simultaneously selects the proper mask to be applied and otherwise prepares the negative for the transfer process.

The next step consists in transferring the picture from the film onto the pre-sensitized offset printing plate which is usually a metal or plastic plate, but also sometimes is a rubber sheet which has been pre-sensitized. The film 43 is placed on the opal glass plate 32 together with a suitable mask 41 the glass plate being on top of the box and then the offset or other printing plate 44 (Figure 5) is placed with its sensitized surface turned downwardly on the said negative.

In Figure 5 a multilith or aluminith plate with tabs is shown by way of example but it will be understood that any plate may be treated in the same manner.

Then the padded lid 40 is again closed and the timer 28 is now set and is operated thus lighting the "black light" tubes 24 which are used for producing the exposure of the sensitized plate 44.

After exposure, the printing plate is removed and the picture is burned in or etched in the well known manner, the printing plate may be then attached to the drum of the offset printing press.

If merely direct negatives are made on a film without a camera the operation is similar to the one already described. The copy is placed with its face up on the opal glass plate 32 while the film 43 is placed with the emulsion side down on top of the copy. Then the lid 40 is closed and fastened and the exposure is made in the manner above described. The lid may then be opened and the film may be removed from the box and developed.

If negatives have to be made from an original 48 (Figure 6) in the form of a sheet carrying the pictures, drawings, or printed matter on both sides, the process is carried out by placing the sensitized paper, negative or film on the opal glass plate 32 the emulsion side up, and that side of the original sheet which is to be reproduced is placed with its face down on the sensitized paper. The box is then closed and exposure takes place using timer 30. The negative is formed by the light reflected from the underside **48*a* of sheet 48** after the light has penetrated the transparent or semi-transparent film or sheet on which the negative is produced.

After the exposure on one side of the sheet 48 the sheet is turned around and the other side **48*b* is turned towards and placed on a new film or sensitized paper sheet 43**. The process is then repeated in the manner already described.

The apparatus according to the invention is thus equipped with means permitting to carry out all steps for the production of an offset printing plate from the making of a screened negative without a camera to the reproduction on the offset printing plate and, in addition, the apparatus is capable of carrying out a number of processes which are usually only carried out on special copying apparatus of photostat machines. The apparatus has thus a multiple usefulness while being simple in construction and operation.

It will be clear that the details of the apparatus may be changed in many ways without departing from the essence of the invention as defined in the annexed claims.

What is claimed as new is as follows:

1. An apparatus for producing offset negatives and impression plates, and a negative from an original, and for opaquing the said negative and for exposing a sensitized impression plate, comprising a box with a hinged padded lid, the box being closed by a light diffusing glass plate for supporting a sensitized element in contact with an original, a negative and a sensitized film and a negative and a sensitized printing plate, respectively, said light diffusing plate being surrounded by a frame, a light diffusing removable opaquing plate fitting over the light diffusing glass plate placed on and supported by the frame of said glass plate, adapted for use during opaquing and masking of a negative, a set of lamps for exposing negatives made from an original copy, said set of lamps being operated by a timer, a darkroom safety lamp, operated by a manual switch, a set of frosted lamps illuminating the opaquing plate from below when placed on the light diffusing glass plate, said last named set of lamps being operated by a manual switch, all the lamps of the aforementioned sets being aligned along the plane of symmetry of the box in the interior thereof, a further set of "black light" fluorescent lamps operated by a second timer, arranged symmetrically on both sides of the first mentioned set of lamps, said further set of lamps exposing the sensitized offset impression plate when placed in contact with a negative on the light diffusing plate, an elastic cushion on said padded lid adapted to press originals and sensitized sheets placed on top of the box firmly against each other, and closure means holding said lid tightly against said box during exposure.

2. An apparatus as claimed in claim 1, wherein the interior of the box is provided with a highly reflecting finish.

3. An apparatus as claimed in claim 1, wherein said opaquing plate is provided with a printing scale along lines running in substantial parallelism to the edges at a distance thereof.

4. An apparatus as claimed in claim 1 wherein the opaquing plate is provided with stencil holding studs.

References Cited in the file of this patent

UNITED STATES PATENTS

| | | |
|---|---|---|
| 897,954 | Von Arnhard | Sept. 8, 1908 |
| 957,665 | Ferguson | May 10, 1910 |
| 1,446,754 | Kohl | Feb. 27, 1923 |
| 1,484,347 | Ullmann | Feb. 19, 1924 |
| 1,812,199 | Crayssac | June 30, 1931 |
| 1,841,229 | Von Teschenbruck | Jan. 12, 1932 |
| 1,951,574 | Karl | Mar. 20, 1934 |
| 2,256,064 | Tupper | Sept. 16, 1941 |
| 2,572,930 | Heldens | Oct. 30, 1951 |